(12) United States Patent
Valencia Estrada et al.

(10) Patent No.: US 12,500,671 B2
(45) Date of Patent: Dec. 16, 2025

(54) OPTICAL DEVICE FOR ORIENTING IN SPACE A RADIATION PATTERN FOR TRANSMISSION AND/OR A RADIATION PATTERN FOR RECEPTION OF LIGHT WAVES OF WIDE SPECTRAL BAND

(71) Applicant: OLEDCOMM, Vélizy-villacoublay (FR)

(72) Inventors: Juan Camilo Valencia Estrada, Vélizy-Villacoublay (FR); Adrian Alejandro Espinoza Garcia, Plaisir (FR)

(73) Assignee: OLEDCOMM, Vélizy-Villacoublay (FR)

( * ) Notice: Subject to any disclaimer, the term of this patent is extended or adjusted under 35 U.S.C. 154(b) by 185 days.

(21) Appl. No.: 18/251,191

(22) PCT Filed: Oct. 29, 2021

(86) PCT No.: PCT/FR2021/051908
§ 371 (c)(1),
(2) Date: Apr. 28, 2023

(87) PCT Pub. No.: WO2022/090673
PCT Pub. Date: May 5, 2022

(65) Prior Publication Data
US 2024/0022328 A1    Jan. 18, 2024

(30) Foreign Application Priority Data

Oct. 30, 2020    (FR) ..................................... 2011150

(51) Int. Cl.
*H04B 10/299*    (2013.01)
*G02B 19/00*    (2006.01)
(Continued)

(52) U.S. Cl.
CPC ........... *H04B 10/299* (2013.01); *H04B 10/11* (2013.01); *H04B 10/40* (2013.01); *G02B 19/0028* (2013.01)

(58) Field of Classification Search
CPC ...... H04B 10/299; H04B 10/11; H04B 10/40; G02B 19/0028
(Continued)

(56) References Cited

U.S. PATENT DOCUMENTS 6,271,953 B1 *  8/2001  Dishman ............. H04B 10/118
                                                         398/91
6,909,854 B1 *  6/2005  Kleiner .............. H04B 10/1121
                                                         398/118

(Continued)

FOREIGN PATENT DOCUMENTS

WO    WO 01/69300 A2    9/2001
WO    WO 2019/238543 A1    12/2019

OTHER PUBLICATIONS

International Search Report as issued in International Patent Application No. PCT/FR2021/051908, dated Feb. 23, 2022.
(Continued)

*Primary Examiner* — Dalzid E Singh
(74) *Attorney, Agent, or Firm* — Pillsbury Winthrop Shaw Pittman LLP

(57) ABSTRACT

An optical device equips a piece of communication equipment of an optical wireless communication network, and includes a monolithic optical element including at least one ruled optical surface having a curved generatrix selected to present an orientation that varies harmonically as a function of angular position, so as to spatially orient a radiation pattern for transmission and/or a radiation pattern for reception of light waves.

16 Claims, 7 Drawing Sheets

(51) Int. Cl.
*H04B 10/11* (2013.01)
*H04B 10/40* (2013.01)

(58) Field of Classification Search
USPC .......................................... 398/126
See application file for complete search history.

(56) References Cited

U.S. PATENT DOCUMENTS

| | | |
|---|---|---|
| 7,113,352 B2 | 9/2006 | Markowitz |
| 9,438,337 B2* | 9/2016 | Byers ................. H04B 10/1123 |
| 10,700,779 B1* | 6/2020 | Panas ..................... H04B 10/66 |
| 2002/0181055 A1* | 12/2002 | Christiansen ...... H04B 10/2587 |
| | | 398/118 |
| 2008/0092879 A1 | 4/2008 | Dominguez et al. |
| 2009/0128921 A1* | 5/2009 | Roth ..................... F21V 7/0091 |
| | | 359/641 |
| 2010/0166430 A1* | 7/2010 | Alten ................. H04B 10/1141 |
| | | 398/135 |
| 2019/0260471 A1* | 8/2019 | Brown ................... H04B 10/11 |
| 2021/0116689 A1* | 4/2021 | Kirrbach ............. G02B 27/123 |

OTHER PUBLICATIONS

Valencia Estrada, J. C., et al., "Free-form Compound Concentrators for Optical Wireless Communications," 2019 Global LIFI Congress (GLC), IEEE, Jun. 2019, XP033629672, pp. 1-6.

* cited by examiner

[Fig. 1]
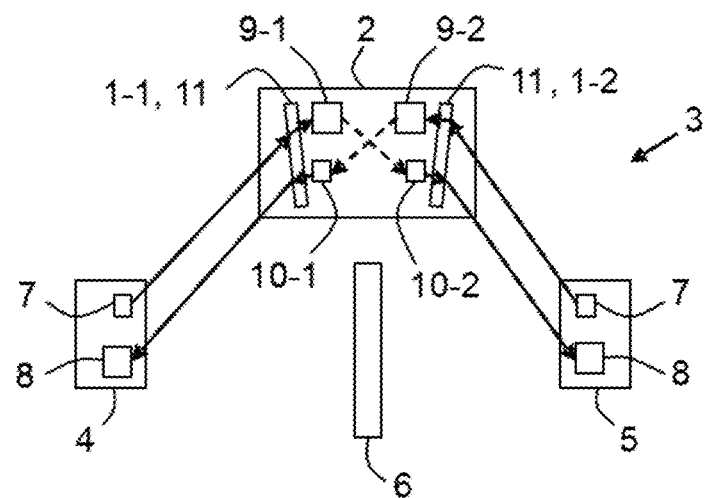
[Fig. 2]
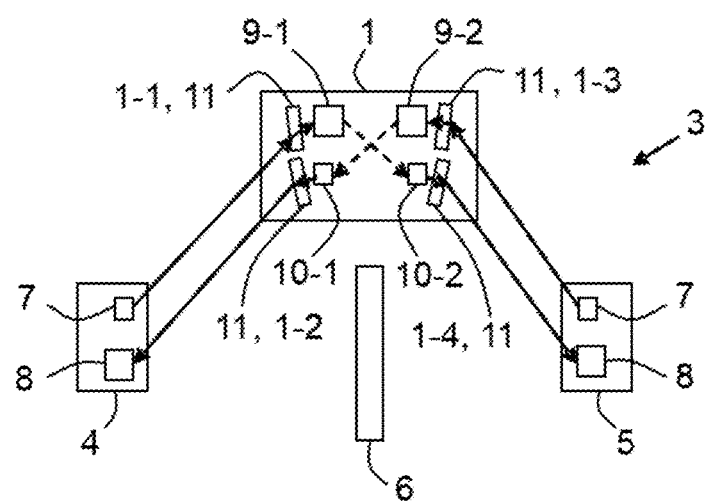

[Fig. 3]
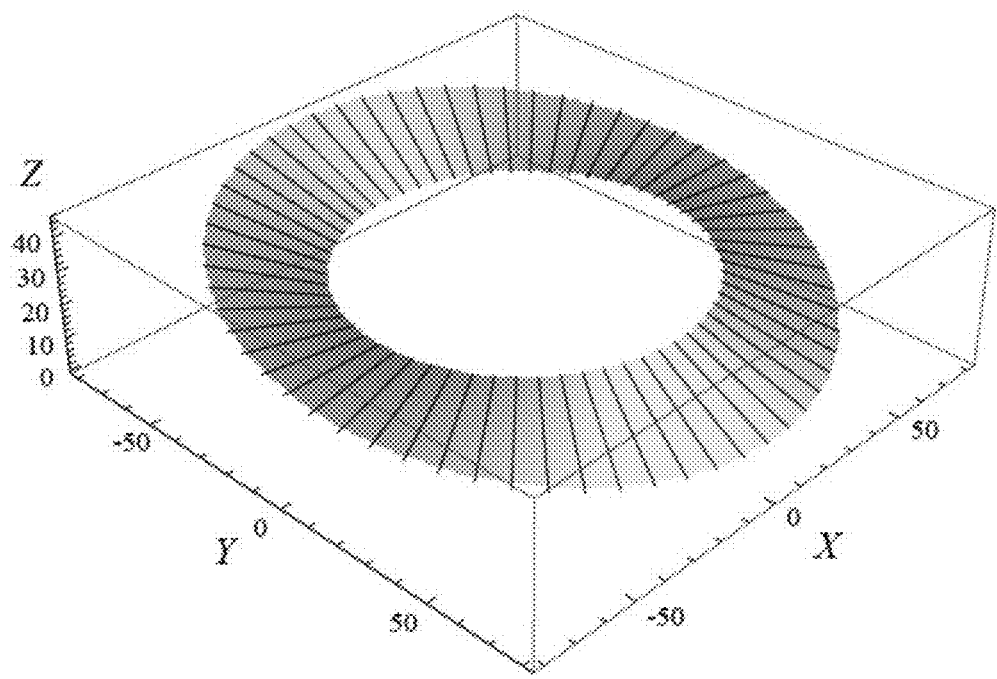
[Fig. 4]
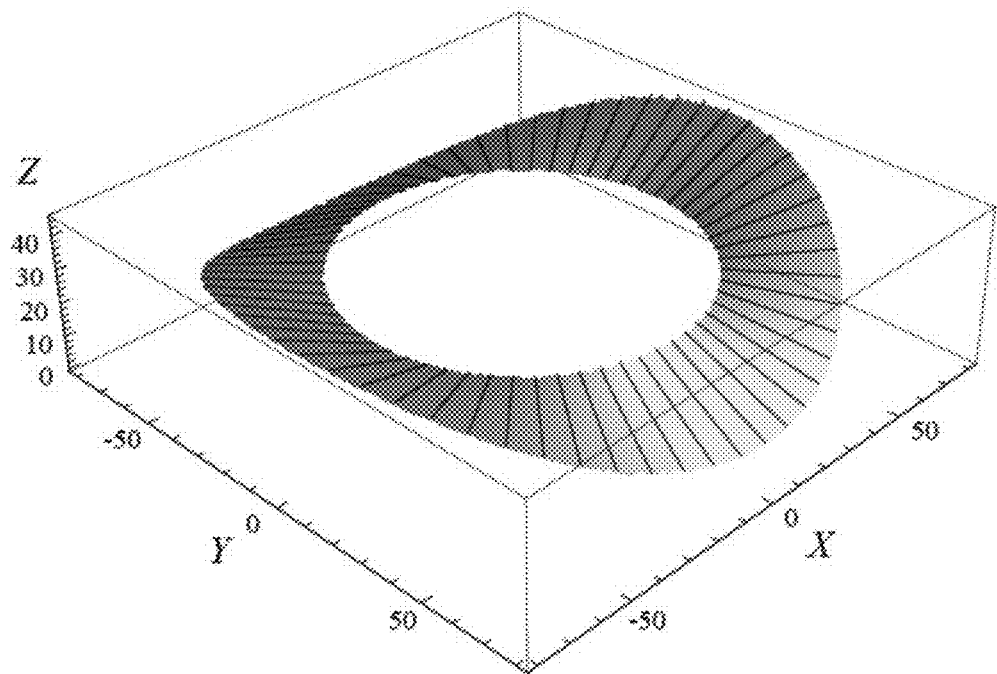

[Fig. 5]
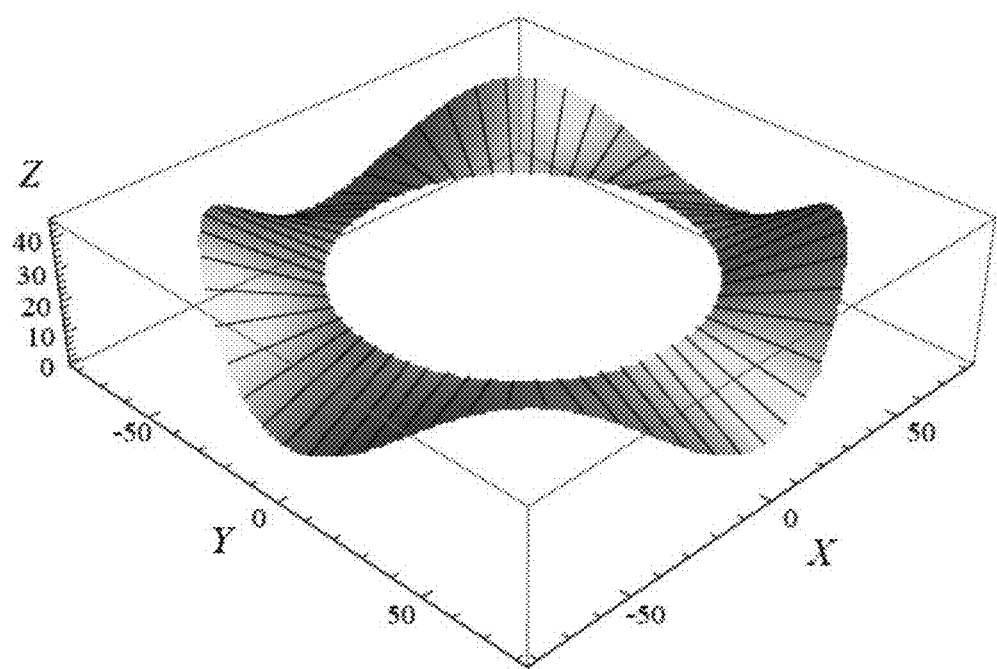
[Fig. 6]
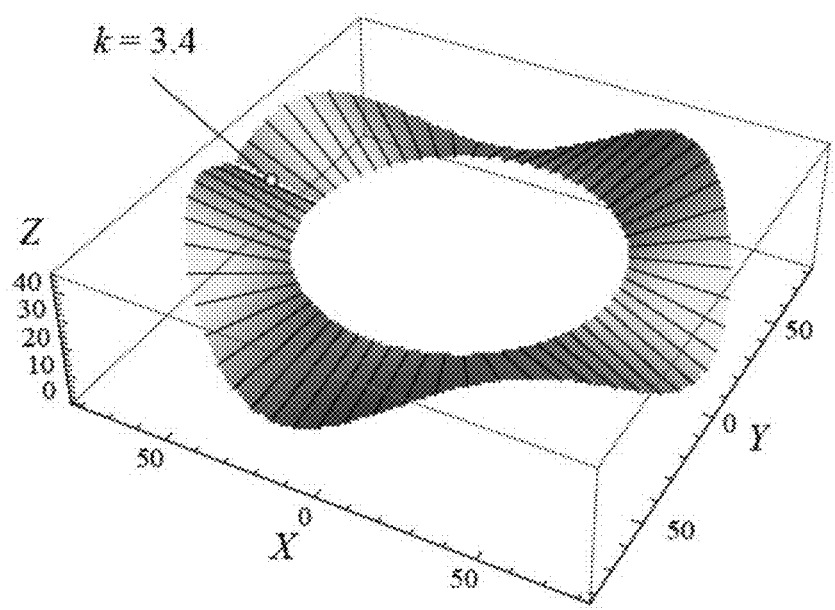

[Fig. 7]
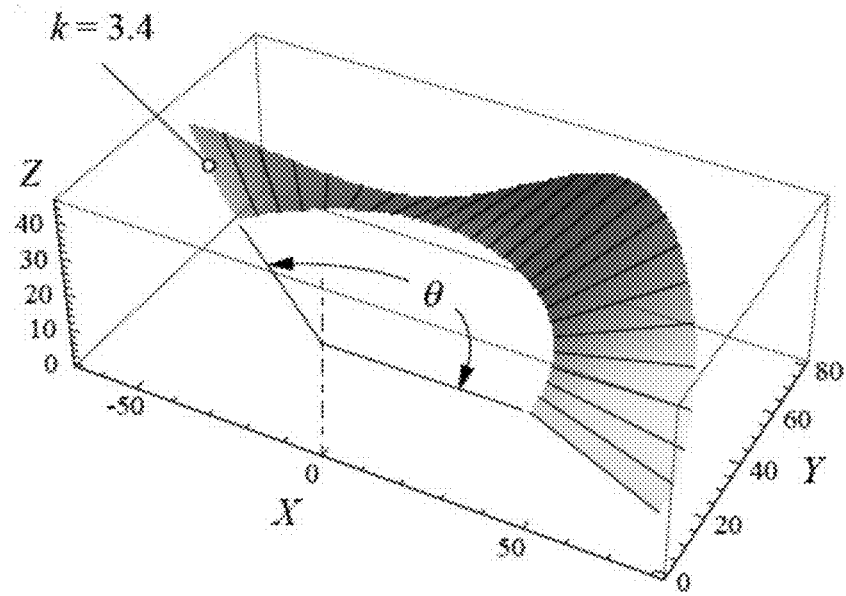
[Fig. 8]
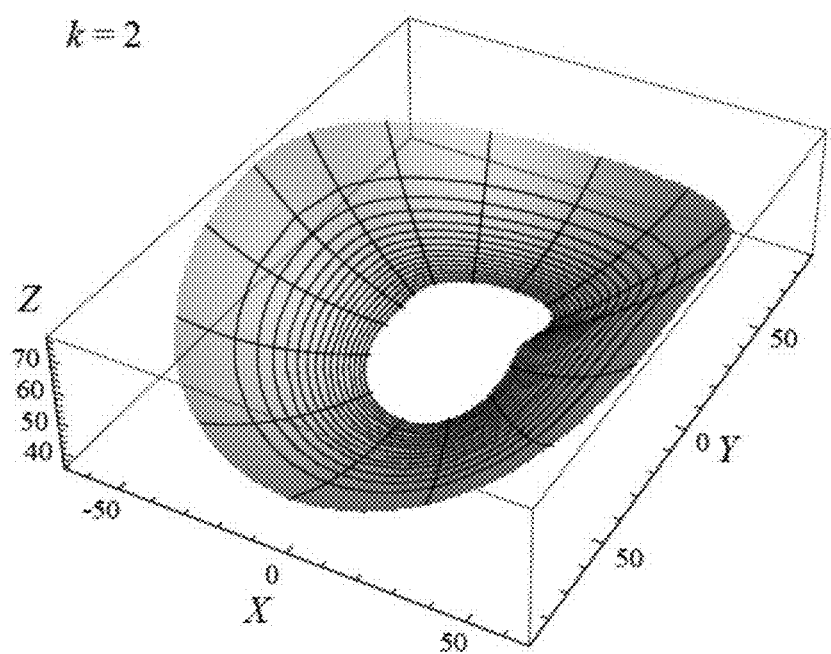

[Fig. 9]
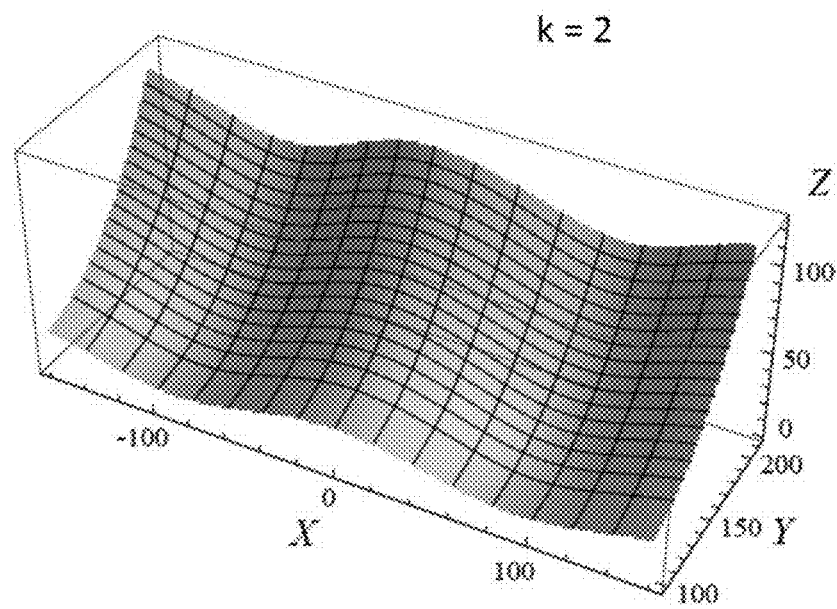
[Fig. 10]
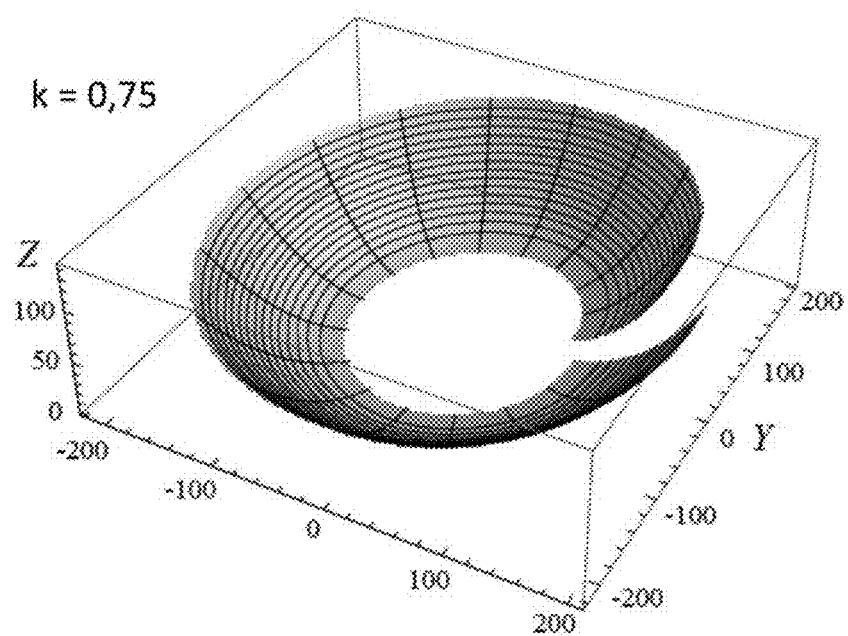

[Fig. 11]
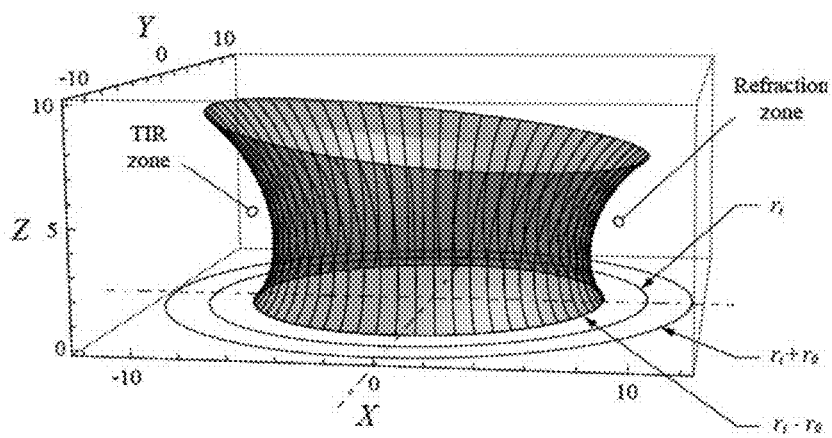
[Fig. 12]
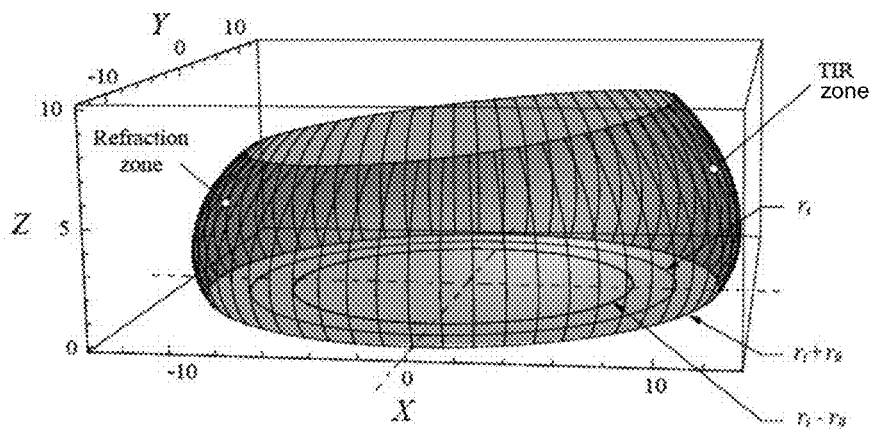

[Fig. 13]
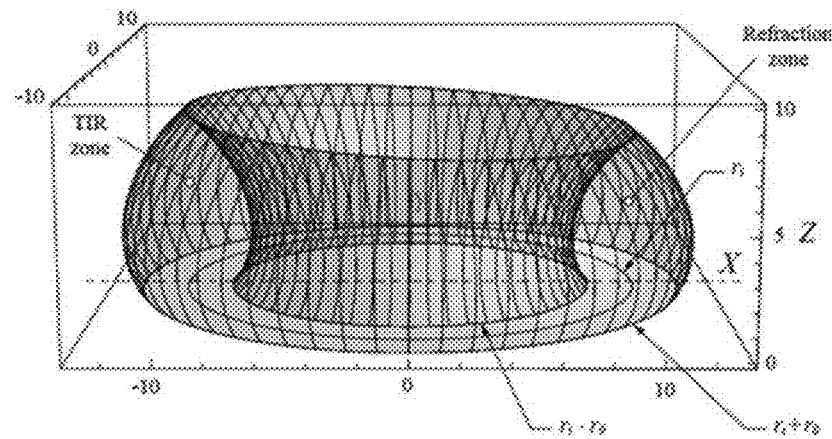
[Fig. 14]
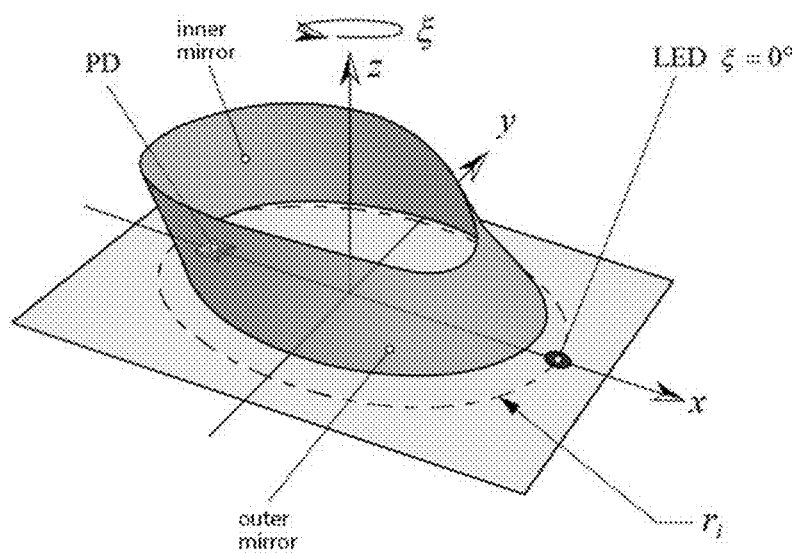

OPTICAL DEVICE FOR ORIENTING IN SPACE A RADIATION PATTERN FOR TRANSMISSION AND/OR A RADIATION PATTERN FOR RECEPTION OF LIGHT WAVES OF WIDE SPECTRAL BAND

CROSS-REFERENCE TO RELATED APPLICATIONS

This application is the U.S. National Stage of PCT/FR2021/051908, filed Oct. 29, 2021, which in turn claims priority to French patent application number 2011150 filed Oct. 30, 2020. The content of these applications are incorporated herein by reference in their entireties.

The present invention relates to optical wireless networks, and more specifically to optical devices which equip certain communication equipment of such networks.

The invention applies more particularly to optical devices in charge for orienting in space a radiation pattern for transmission and/or a radiation pattern for reception of light waves for an Optical Wireless Communication (or OWC) piece of equipment of an optical wireless network, possibly of the LiFi ("Light Fidelity") type. But the invention relates to other types of wireless communication than LiFi, such as communications with terahertz (THz), microwave or radio radiation.

It should be noted that the optical wireless communication piece of equipment may, for example, be an optical signal repeater, i.e., a piece of communication equipment comprising a receiver receiving light waves (or optical signals) from a first node of an optical wireless network, and a transmitter transmitting these received light waves (or optical signals) to at least one second node separated from the first node by an obstacle preventing the passage of light waves. Such an optical signal repeater can be unidirectional or bidirectional.

There are several types of optical devices capable of spatially orienting a radiation pattern for transmission and/or a radiation pattern for reception of light waves (or "beam steering").

For example, some optical devices include galvanometers associated with servos, which requires a high-power supply and thus preclude use in low-cost, low-power OWC optical wireless communication piece of equipment.

Other optical devices include Micro Electro Mechanical Systems (or MEMS) and deflectors. These MEMS allow the radiation pattern for transmission to be varied in space by controlled orientation of micro-lenses or micro-mirrors or by local deformation of a mirror by means of micro-actuators. This solution also requires a high-power supply, is expensive, not very durable (typically about two years), and offers a relatively limited directional range.

Still other optical devices include holographic or diffractive elements. They are simple and consume little electrical energy, but are expensive and unsuitable for a wide spectral band.

Further optical devices comprise a lens comprising at least one optical surface whose particular shape allows spatial orientation of a radiation pattern for transmission and/or a radiation pattern for reception of light waves. This is especially the case for the optical device described in U.S. Pat. No. 7,113,352 B2 and in which the lens is monolithic and comprises at least one optical surface known as a ruled surface with rectilinear (or straight) generatrixes. The term "monolithic" means made of a single piece, and an optical surface is said to be "ruled" if it has been generated by the translation and/or rotation of a generatrix. For example, if the optical surface is generated by a rectilinear segment, and the initial position of all the points of the generatrix coincides only with the final position, an annular ruled optical surface is generated and the latter is completely smooth in its interior points. A well-known example of such an optical surface is the Möbius strip. This type of optical device is certainly inexpensive to manufacture and consumes little electrical energy, but it is difficult to use for a wide spectral band.

It may thus be desirable to provide an optical device that makes it possible to avoid at least some of the above-mentioned problems and constraints.

For this purpose, an optical device is particularly proposed, on the one hand, intended to form part of a piece of communication equipment of an optical wireless communication network, and, on the other hand, comprising a monolithic optical element and comprising at least one ruled optical surface capable of orienting in space a radiation pattern for transmission and/or a radiation pattern for reception of light waves.

This optical device is characterized by the fact that at least one ruled optical surface of its optical element has a curved generatrix selected to have an orientation that varies harmonically as a function of angular position. A "harmonic function" is understood here to be a function having a cyclic variation, without restriction on the number of cycles or the number of periods.

Thus, an optical device is available that is inexpensive to manufacture, consumes little electrical energy, and can be used for a wide spectral band and offer a relatively large directional range.

The optical device according to the invention may comprise other features that may be taken separately or in combination, and in particular:

- its (each) ruled optical surface of the optical element can have a continuously varying orientation, infinitely differentiable and expressible in Taylor series;
- in the presence of the previous option, the plane containing the curved generatrix can be meridional. In this case, the generatrix can be represented by a position vector represented using polar coordinates to define the Cartesian coordinates by $p_1=[\pm R(\alpha)\cos(\alpha+\beta), R(\alpha)\sin(\alpha+\beta)]$, where $\alpha$ is an angle of elevation, $R(\alpha)$ is the norm of a vector radius, and $\beta$ is an angle of inclination that varies harmonically as a function of angular position;
- in the presence of the previous sub option, the norm $R(\alpha)$ of the vector radius can vary harmonically as a function of angular position;
- the ruled optical surface of the optical element may be an internal face providing total internal reflection. In this case, the optical element may have a refractive index that varies harmonically with angular position;
- the (each) ruled optical surface of the optical element can be open or closed.

The invention also proposes a piece of communication equipment intended to form part of an optical wireless network and comprising at least a first receiver suitable for receiving light waves coming from a first piece of equipment of the optical wireless network, and/or at least a first transmitter suitable for transmitting light waves to the first piece of equipment or to a second piece of equipment of the optical wireless network.

This communication equipment is characterized by the fact that it comprises at least a first optical device of the type presented above, placed upstream of the possible first receiver and/or downstream of the possible first transmitter.

The communication equipment according to the invention may comprise other features that may be taken separately or in combination, and in particular:
- in a first, so called "synchronous", embodiment, this piece of communication equipment may comprise the first receiver and the first transmitter, with a first optical device placed upstream of the first receiver and downstream of the first transmitter in order to orient in space a radiation pattern for reception of light waves and a radiation pattern for transmission of light waves;
- in this first embodiment, the first transmitter can be suitable to transmit to the first piece of equipment other light waves coming from the second piece of equipment. In this case, it can also comprise a second transmitter coupled to the first receiver and suitable for transmitting to the second piece of equipment the light waves coming from the first receiver, a second receiver suitable for receiving the other light waves coming from the second piece of equipment and coupled to the first transmitter, and a second optical device placed upstream of the second receiver and downstream of the second transmitter in order to orient in space a radiation pattern for reception of the other light waves and a radiation pattern for transmission of the light waves;
- in a second, so-called "asynchronous", embodiment, this piece of communication equipment may comprise the first receiver and the first transmitter, with the first optical device placed upstream of the first receiver in order to orient in space a radiation pattern for reception of the light waves. In this case, it may comprise a second optical device placed downstream of the first transmitter in order to spatially orient a radiation pattern for transmission of the light waves;
- in this second embodiment, the first transmitter is suitable to transmit to the first piece of equipment other light waves coming from the second piece of equipment. In this case, it can also comprise a second transmitter coupled to the first receiver and suitable for transmitting to the second piece of equipment the light waves coming from the first receiver, a second receiver suitable for receiving the other light waves coming from the second piece of equipment and coupled to the first transmitter, a third optical device placed upstream of the second receiver in order to spatially orient a radiation pattern for reception of the other light waves, and a fourth optical device placed downstream of the second transmitter in order to spatially orient a radiation pattern for transmission of the light waves;
- for example, it can constitute an optical signal repeater and/or an optical signal multiplexer and/or an optical signal expander and/or an optical signal combiner.

The invention will be better understood with the aid of the following description, given solely by way of example and made with reference to the appended drawings in which:

FIG. 1 illustrates diagrammatically and functionally a first example embodiment of an optical signal repeater comprising two optical devices according to the invention and forming part of an optical wireless network, FIG. 2 illustrates diagrammatically and functionally a second example embodiment of an optical signal repeater comprising four optical devices according to the invention and forming part of an optical wireless network, FIG. 3 illustrates diagrammatically within a spatial diagram, a first example of an annular ruled optical surface having a first harmonic variation of the slope of its generatrix, FIG. 4 illustrates diagrammatically within a spatial diagram, a second example of an annular ruled optical surface having a second harmonic variation of the slope of its generatrix, FIG. 5 illustrates diagrammatically within a spatial diagram, a third example of an annular ruled optical surface having a third harmonic variation of the slope of its generatrix, FIG. 6 illustrates diagrammatically within a spatial diagram, a first example of a non-annular ruled optical surface having a first harmonic variation of the slope of its generatrix, FIG. 7 illustrates diagrammatically within a spatial diagram, a second example of a non-annular ruled optical surface having a second harmonic variation of the slope of its generatrix, FIG. 8 illustrates diagrammatically within a spatial diagram, a fourth example of an annular ruled optical surface having a fourth harmonic variation of the slope of its parabolic generatrix, FIG. 9 illustrates diagrammatically within a spatial diagram, a third example of a non-annular ruled optical surface having a third harmonic variation of the slope of its parabolic generatrix, FIG. 10 illustrates diagrammatically within a spatial diagram, a fourth example of a non-annular ruled optical surface having a fourth harmonic variation of the slope of its parabolic generatrix, FIG. 11 illustrates diagrammatically within a spatial diagram, a fifth example of an annular ruled inner optical surface, generated by rotation of a variable optical barrier, FIG. 12 illustrates diagrammatically within a spatial diagram, a sixth example of an annular ruled external optical surface, generated by rotation of a variable optical barrier with a phase change, FIG. 13 shows diagrammatically within a spatial diagram, an example of an optical element 11 comprising the two ruled optical surfaces of FIGS. 11 and 12, and FIG. 14 illustrates diagrammatically an example of an optical element defining a ruled annular mirror with two reflecting faces, having as generatrix a straight-line segment, and placed on a printed circuit board on which are installed a light emitting diode and a photodiode.

In particular, a purpose of the invention is to propose an optical device 1 intended to be part of a piece of communication equipment 2, itself intended to be part of an optical wireless network 3.

In the following, it is considered that the (optical wireless) network 3 is of LiFi type. However, the invention is not limited to this type of optical wireless network. Indeed, it concerns any type of optical wireless network within which the communications are of OWC (Optical Wireless Communication) type.

Parts of examples of an optical wireless network 3 have been diagrammatically and functionally represented in FIGS. 1 and 2. In these examples, the (optical wireless) network 3 comprises a piece of communication equipment 2 comprising optical devices 1 according to the invention, and two other pieces of communication equipment 4 and 5 (here not comprising an optical device 1, but which could comprise at least one). For example, these two other pieces of communication equipment 4 and constitute two nodes of the network 3 which must communicate bidirectionally by means of light waves comprising optical signals, and which are separated by an obstacle 6 preventing the light (and thus the light waves) from passing. These pieces of communication equipment 4 and 5 can, for example, be access points to the network 3, computers (fixed or portable), electronic tablets, cell smartphones, or game consoles, each equipped with an optical interface piece of equipment. The latter comprises a transmission module 7 in charge of transforming electrical signals carrying information (or data) into intensity-modulated light signals to transport the same information (or data), and a reception module 8 in charge of transforming intensity-modulated light signals (to transport information (or data)) into electrical signals carrying the same information (or data).

In the two illustrated examples, the piece of communication equipment 2 constitutes a bidirectional optical signal repeater allowing to transmit the first light waves coming from the first node (or piece of communication equipment) 4 to the second node (or piece of communication equipment) 5, and reciprocally to transmit the second light waves coming from the second node (or piece of communication equipment) 5 to the first node (or piece of communication equipment) 4. To this end, the first node 4 comprises in particular a first receiver 9-1 suitable for receiving first light waves coming from a first piece of equipment of the network 3 (here the first node 4), a second receiver 9-2 suitable for receiving second light waves coming from a second piece of equipment of the network 3 (here the second node 5) a first transmitter 10-1 coupled to the second receiver 9-2 and suitable to transmit to the first piece of equipment 4 of the network 3 the second light waves received by the second receiver 9-2 and coming from the second piece of equipment 5 of the network 3, and a second transmitter 10-1 coupled to the first receiver 9-1 and suitable to transmit to the second piece of equipment 4 of the network 3 the first light waves received by the first receiver 9-1 and coming from the first piece of equipment 4 of the network 3.

In an alternative embodiment, the piece of communication equipment 2 could constitute a monodirectional optical signal repeater. In this case, it comprises in particular a single receiver 9-1 suitable for receiving light waves coming from a piece of equipment of the network 3 (for example the first node 4), and at least one transmitter coupled to the first receiver 9-1 and suitable for transmitting to at least one other piece of equipment of the network 3 (for example the second node 5) the light waves received by the receiver 9-1.

As non-limitingly illustrated in FIGS. 1 and 2, the piece of communication equipment 2 comprises at least one optical device 1, according to the invention.

This optical device 1 comprises a monolithic optical element 11 comprising at least one ruled optical surface (see FIGS. 3 to 10) having a curved generatrix selected to have an orientation that varies harmonically as a function of angular position θ, so as to spatially orient a radiation pattern for transmission and/or a radiation pattern for reception of light waves.

This provides an optical device 1 that is notably inexpensive to manufacture, consumes little electrical energy, and can be used for a wide spectral band and offer a relatively large directional range.

It will be understood that, according to the needs, the optical element 11 can orient in space either only a radiation pattern for transmission of light waves when it acts only for a transmitter 10-*j* (here j=1 or 2), and therefore downstream of the latter (10-*j*), or only a radiation pattern for reception of light waves when it acts only for a receiver 9-*k* (here k=1 or 2), and thus upstream of the latter (9-*k*), or still a radiation pattern for transmission of light waves and a radiation pattern for reception of light waves when it acts both for a transmitter 10-*j* and for a receiver 9-*k*.

In the following, as in the foregoing, the notions "upstream" and "downstream" are considered with respect to the direction of propagation of light waves. Therefore, an optical element 11 is upstream of a receiver 9-*k* when it acts on incident light waves before the latter reach this receiver 9-*k*, and an optical element 11 is downstream of a transmitter 10-*j* when it acts on incident light waves from this transmitter 10-*j*.

It is recalled that the term "monolithic" here means composed of a single piece, and that an optical surface is said to be "ruled" if it has been generated by the translation and/or rotation of a generatrix (straight or curved line in a three-dimensional space).

In the first example shown non-limitingly in FIG. 1, the piece of communication equipment 2 includes first 1-1 and second 1-2 optical devices. The first optical device 1-1 is referred to as "synchronous" in that it is positioned upstream of the first receiver 9-1 and downstream of the first transmitter 10-1 to simultaneously spatially orient a radiation pattern for reception of light waves and a radiation pattern for transmission of light waves for bidirectional optical wireless communications with the first node 4. The second optical device 1-2 is also synchronous in that it is located upstream of the second receiver 9-2 and downstream of the second transmitter 10-2 to spatially orient a radiation pattern for reception of light waves and a radiation pattern for transmission of light waves for bidirectional optical wireless communications with the second node 5.

In the second example shown non-limitingly in FIG. 2, the piece of communication equipment 2 includes first 1-1, second 1-2, third 1-3 and fourth 1-4 optical devices. The first optical device 1-1 is referred to as "asynchronous" in that it is placed only upstream of the first receiver 9-1 to spatially orient a radiation pattern for reception of light waves to receive optical wireless communications from the first node 4, and operates independently of the second optical device 1-2. The second optical device 1-2 is also asynchronous in that it is located only downstream of the first transmitter 10-1 in order to spatially orient a radiation pattern for transmission of light waves for transmitting optical wireless communications to the first node 4. The third optical device 1-3 is also asynchronous in that it is positioned only upstream of the second receiver 9-2 to spatially orient a radiation pattern for reception of light waves to receive optical wireless communications from the second node 5, and operates independently of the fourth optical device 1-4. The fourth optical device 1-4 is also asynchronous in that it is positioned only downstream of the second transmitter 10-2 to spatially orient a radiation pattern for transmission of light waves to transmit optical wireless communications to the second node 5.

It should be noted that in the two examples illustrated non-limitingly in FIGS. 1 and 2, each optical device 1-*m* (here, m=1 to 4) comprises an optical element 11 constituting an optical system through which the incident light waves pass (in transmission, reflection, absorption and photoconversion) while having their trajectories modified. But an optical element 11 can also constitute a prism or a lens when it ensures a refraction of the incident light waves, or a mirror when it ensures a reflection of the incident light waves, for example.

In one embodiment, the (each) ruled optical surface of the optical element 11 may have a continuously varying orientation that is infinitely differentiable and expressible in Taylor series. This type of optical surface having a "smoothly" varying slope can be represented by the relationship:

$$s=[x,y,m(\theta)(\sqrt{x^2+y^2}-r_0)+z_0].$$

For example, a harmonic variation of orientation (or slope) of the type $m(\theta)=m_0 \cos(k\theta)$ can be obtained, which then results in an optical element 11 having an ruled ring shape with at least one optical surface represented by the relation:

$$s=[x,y,(m_0 \cos(k\theta))(\sqrt{x^2+y^2}-r_0)z_0],$$

where k is a shape factor and $m_0$ the initial slope.

The latter relationship can be expressed in cartesian coordinates by performing the variable change $\{\theta \to \arg(x+iy)\}$, where arg is the argument function and i is a pure imaginary number.

The shape factor allows the ring to be closed if and only if k is a non-zero integer. It also determines the number of cycles in the ring.

The spatial diagrams of FIGS. 3 to 5 show diagrammatically first, second and third examples of annular ruled optical surfaces having first, second and third harmonic variations in the slope of their generatrix respectively. The first example in FIG. 3 corresponds to the case k=1. The second example in FIG. 4 corresponds to the case k=2. The third example in FIG. 5 corresponds to the case k=4. In all three optical surfaces in FIGS. 3 through 5, the slope was set with $m=-\frac{1}{2} \cos(k \arg(x+iy))$. It can be observed that the integer k corresponds to the number of times the upper and lower levels are repeated.

It should be noted that k can also be a non-integer real number. In this case, the optical surface is ruled but it is not annular since it cannot be closed. k can also be a real number less than one but never equal to zero. Diagrammatically illustrated on the spatial diagrams of FIGS. 6 and 7 are, respectively, first and second examples of non-annular ruled optical surfaces having, respectively, first and second harmonic variations of the slope of their generatrix for k=3.4 and a slope calculated with $m=-\frac{1}{2} \cos(k \arg(x+iy))$. In the first example of FIG. 6 the optical surface has been evaluated with a polar angle $\theta$ varying between $-\pi$ and $\pi$, and a discontinuity can be observed when the polar angle is equal to 180°. In the second example of FIG. 7 the optical surface has been evaluated with a polar angle $\theta$ varying between 0 radian and $4\pi/5$ radians.

It can be seen from FIGS. 3 to 7 that all sectors or polar sections of a harmonically varying sloped optical surface (whether annular or not) can be used to design synchronous optical elements provided that each sector of optical surface contains one or more complete cycles. When a surface has harmonic variation in its shape, it can be represented mathematically with trigonometric functions.

It should be noted that a meridional plane can be used for the generatrix. A "meridional plane" is defined here as a plane containing the axis of an optical system (it is also known as a tangential plane). In this case, the generatrix can, for example, be represented by a position vector represented in using polar coordinates as parameters to define the Cartesian coordinates by $p_1=[\pm R(\alpha)\cos(\alpha+\beta), R(\alpha)\sin(\alpha+\beta)]$, where $\alpha$ is an angle of elevation, $R(\alpha)$ is the norm of a vector radius, and $\beta$ is an angle of inclination that varies harmonically as a function of angular position.

In fact, to obtain this representation in using polar coordinates, it is necessary to start from an explicit function $z_g=f(r)$ which contains the segment of the generatrix and can be represented with a position vector on a meridional plane by the relation $P_1=[r, f(r)]$, where f(r) can be a continuous function or by sections. This last relation can then be transformed using polar coordinates, which gives the relation $P_1=[R(\alpha)\cos \alpha, R(\alpha)\sin \alpha]$, where $\alpha$ is the elevation angle and $R(\alpha)$ is the norm of the vector radius ($\|P_1\|=\sqrt{r^2+f(r)^2}$, if $f(R(\alpha)\cos \alpha)=R(\alpha)\sin \alpha$).

Now, if the generatrix is made symmetrical and orientable (according to an angle of inclination $\beta$), the meridional position vector $p_1$ can be rewritten as:

$$P_1=[\pm R(\alpha)\cos(\alpha+\beta), R(\alpha)\sin(\alpha+\beta)],$$

and thus, the optical surface ruled by a revolution in three-dimensional parametric coordinates can be represented with the relation:

$$s=[\pm R(\alpha)\cos(\alpha+\beta)\cos \theta, \pm R(\alpha)\cos(\alpha+\beta)\sin \theta, R(\alpha)\sin(\alpha+\beta)],$$

where $\theta$ is the rotation angle.

If the surfaces, represented by the last relation, is to be annular with a harmonic variation of the angle of inclination $\beta$, then then this last relation can be rewritten:

$$s=[\pm R(\alpha)\cos(\alpha+\beta(\theta))\cos \theta, \pm R(\alpha)\cos(\alpha+\beta(\theta))\sin \theta, R(\alpha)\sin(\alpha+\beta(\theta))],$$

with the conditions:

$$\begin{cases} \beta(\theta) \neq \text{constant}, \\ \{x, y, z\} \text{ constant and } \in s, \forall (\alpha, \theta) \end{cases}.$$

If the inclination angle $\beta$ of the generatrix varies harmoniously, $\beta(\theta)$ is a harmonic function. For example, $\beta(\theta)=g(\cos(k\theta))$ can be chosen, and in this case, the generated optical surface is smooth, annular and closed, if and only if k is an integer other than zero.

A fourth example of an annular ruled optical surface with a fourth harmonic variation of the slope of its generatrix (here parabolic) is diagrammatically illustrated on the spatial diagram of FIG. 8. This example corresponds to a focal length f=50 mm, a maximum elevation angle $\alpha=\pi/10$, an internal radius $r_i$ of the annular optical surface equal to 100 mm, an inclination angle $\beta=(\pi/180)*(40+10 \cos(2\theta))$, and an elevation radius given by the relation:

$$R(\alpha)=\sec \alpha(r_i-2*f \sin \alpha(r_i \cos \alpha+f \sin \alpha)+2f \tan \alpha).$$

It should also be noted that the norm $R(\alpha)$ of the vector radius can also, possibly, vary harmonically as a function of the angular position $\theta$.

In this case the ruled optical surface can be represented by the relation:

$$s=[\pm R(\theta,\alpha)\cos(\alpha+\beta(\theta))\cos \theta, \pm R(\theta,\alpha)\cos(\alpha+\beta(\theta))\sin \theta, R(\theta,\alpha)\sin(\alpha+\beta(\theta))],$$

with the same conditions as before:

$$\begin{cases} \beta(\theta) \neq \text{constant}, \\ \{x, y, z\} \text{ constant and } \in s, \forall (\alpha, \theta) \end{cases}.$$

The ruled optical surface represented by the last relationship (with the preceding conditions) can also be a smooth, harmonic sector that contains at least one complete period (or a complete block).

A third example of a non-annular ruled optical surface with a third harmonic variation of the slope of its generatrix (in this case parabolic) is diagrammatically illustrated in the spatial diagram of FIG. 9. This example corresponds to a focal length f=50 mm, a maximum elevation angle α=π/10, an internal radius $r_i$ of the linear annular optical surface ($r_i$=[x,0,0]) and equal to 100 mm, an inclination angle β=(π/180)*(10+5 cos(x π/180)), and an elevation radius given by the relation:

$$R(\alpha)=\sec\alpha(r_i+2*\sqrt{f\sin\alpha(r_i\cos\alpha+f\sin\alpha)}+2f\tan\alpha).$$

A fourth example of a non-annular ruled optical surface with a fourth harmonic variation of the slope of its generatrix (here parabolic), giving it a spiral shape, is diagrammatically illustrated on the spatial diagram of FIG. 10. This example corresponds to a focal length f=50 mm, a maximum elevation angle α=π/10, an internal radius $r_i$ of the linear annular optical surface ($r_i$=[x,0,0]) and equal to 100 mm, an inclination angle β=(π/180) (10+10 cos(0,75θ)), and an elevation radius given by the relation:

$$R(\alpha)=\sec\alpha(r_i+2*\sqrt{f\sin\alpha(r_i\cos\alpha+f\sin\alpha)}+2f\tan\alpha).$$

It should also be noted that if the internal radius $r_i$ of the optical surface (or "displacement rail") is linear, this optical surface can be represented by the relation: $s=r_i+p_1(\|r_i\|,\alpha,\beta(\|r_i\|))$, where $r_i$ becomes the position vector of the generatrix $p_1$. The optical surface s is then a function of the displacement distance $\|r_i\|$, the elevation angle α and the inclination angle β. The inclination angle β is a harmonic function of the displacement distance, with the condition $\beta(\|r_i\|)\neq$constant. This allows the inclusion of any curved linear displacement rail in three-dimensional space where the inclination angle β is a function of the arc length of the parametric trajectory $r_i$. For example, if the optical surface is represented by the relationship: s=[x, ±R(x, α)cos(α+β((x)), ±R(x, α)sin(α+β(x))], and the ruled optical surface is intended to be harmonic, β(x) must be a harmonic function, such as β(x)≠β0+Δβ cos (kx). In this purely illustrative example, there are $r_i$=[x, 0, 0] and $p_1$=[0, ±R(x,α)cos(α+((x)), ±R(x, α)sin (α+β(x))].

It should also be noted that the (that one) ruled optical surface of the optical element 11 may be an inner (or internal) face that provides total internal reflection (or refraction). In this case, the optical element 11 has an index of refraction n(θ) that varies harmonically as a function of angular position θ. Such an option can be combined with at least one of the preceding options.

In the presence of the last option, one can introduce for the generatrix the notion of "optical barrier" $R_{local}$ which ensures a Total Internal Reflection (or TIR). For example, the latter ($R_{local}$) can be represented by the relation:

$$R_{local} = e^{\frac{\varpi}{\sqrt{n(\theta)^2-1}}} r_0,$$

where $\overline{\omega}$ is the local elevation (a function of the elevation angle α with respect to the global coordinate origin), and the refractive index n(θ) has a harmonic variation with the additional condition n(θ)≠constant to create an optical surface providing total internal reflection.

The optical barrier can be represented parametrically on a meridional plane with a position vector $p_{local}$ that can be represented by the relation:

$$p_{local} = \left[\pm e^{\frac{\varpi}{\sqrt{n(\theta)^2-1}}} r_0\cos\varpi,\ e^{\frac{\varpi}{\sqrt{n(\theta)^2-1}}} r_0\sin\varpi\right].$$

This optical barrier can be located on one side of an optical surface (for example the right side (with the + sign) or the left side (with the − sign) with respect to the local origin of the coordinates).

f the inclination of the generatrix is local (i.e. with respect to the origin of the local coordinates), the previous relation becomes:

$$p_{local} = \left[\pm e^{\frac{\varpi}{\sqrt{n(\theta)^2-1}}} r_0\cos(\varpi+\beta(\theta)),\ e^{\frac{\varpi}{\sqrt{n(\theta)^2-1}}} r_0\sin(\varpi+\beta(\theta))\right],$$

with an angle of inclination β which can be constant or variable.

In order for the ruled optical surface to be harmonious with a variable inclination angle β, β must be a function of the angular position θ in the x-y (or XY) plane. The closest point to the generatrix (when $\overline{\omega}$=0) is then always at a distance $r_0$, whatever the inclination angle β it may have.

To create a ring-shaped optical surface using the last relationship, the global elevation radius R and the corresponding global elevation angle α must be calculated. For this purpose, the position vector $p_1$ can be represented by the following relationship if the origin of the local coordinates is shifted to the absolute coordinates $\{r_i, z_i\}$:

$$p_1 = r_i + p_{local} = [r_i, z_i] + \left[\pm e^{\frac{\varpi}{\sqrt{n(\theta)^2-1}}} r_0\cos(\varpi+\beta(\theta)),\right.$$
$$\left. e^{\frac{\varpi}{\sqrt{n(\theta)^2-1}}} r_0\sin(\varpi+\beta(\theta))\right]$$
$$= \left[\pm e^{\frac{\varpi}{\sqrt{n(\theta)^2-1}}} r_0\cos(\varpi+\beta(\theta))+r_i,\right.$$
$$\left. e^{\frac{\varpi}{\sqrt{n(\theta)^2-1}}} r_0\sin(\varpi+\beta(\theta))+z_i\right]$$

As it can be seen in the spatial diagrams of FIGS. 11 and 12, annular optical surfaces defined by the previous relationship can present refractions and reflections for the additional sector, with a radiant flux distribution that varies as a function of angular position θ.

It is thus possible to create an annular catadioptric optical surface that can be represented parametrically by the relation:

$$s=[\pm p_{1,r}\cos\theta, \pm p_{1,r}\sin\theta, p_{1,z}],$$

where $p_{1,r}$ is the radial component of $p_1$, and $p_{1,z}$ is the z-direction component of $p_1$.

By developing the last relation, the optical surface s reduces to the column vector:

$$s = \begin{bmatrix} \pm\left(e^{\frac{\varpi}{\sqrt{n(\theta)^2-1}}} r_0\cos(\varpi+\beta(\theta))+r_i\right)\cos\theta \\ \pm\left(e^{\frac{\varpi}{\sqrt{n(\theta)^2-1}}} r_0\cos(\varpi+\beta(\theta))+r_i\right)\sin\theta \\ e^{\frac{\varpi}{\sqrt{n(\theta)^2-1}}} r_0\sin(\varpi+\beta(\theta))+z_i \end{bmatrix}.$$

Such an annular catadioptric surface can be represented parametrically by the local elevation angle $\overline{\omega}$, the rotation angle θ, and the sign s=+/−1, with the fundamental conditions that ensure that the surface piece (piecewise defined function) contains no invariant points:

$$\{\{x,y,z\}\text{constant}\in s, \forall(\overline{\omega},\theta)\}.$$

The local elevation angle $\bar{\omega}$ is bounded by $0<\bar{\omega}_{min}\leq\bar{\omega}\leq\bar{\omega}_{max}$. The extreme values $\bar{\omega}_{min}$ and $\bar{\omega}_{max}$ should be preset or calculated based on the total emission angle and orientation variation in space of $\bar{\omega}$.

A ruled annular inner optical surface generated by rotating a variable optical barrier is shown in FIG. 11, by taking s=1, $r_0$=2, $r_i$=10, $r_o$=12, $z_i$=0, β=0°, $\bar{\omega}_{min}$=0, $\bar{\omega}_{max}$=π/2, et n(θ)=1,5556+0,1 cos θ. All dimensional variables are here in millimeters, and all angular variables are here in radians. As $\bar{\omega}_{max}$=π/2, the projection of the upper contour on the x-y (or XY) plane corresponds to the circle of radius $r_i$. If a transmitter is placed at any point of the circle of radius $r_i$, part of the incident light reaches the ruled optical surface and can be reflected with the portion ensuring Total Internal Reflection (or TIR) or refracted. Depending on the angular position of the ring in relation to the transmitter, the distribution of the incident light can vary harmoniously.

Another ruled outer annular optical surface generated by rotating a variable optical barrier with a phase change is shown in FIG. 12, by taking s=−1, $r_0$=2, $r_i$=10, $r_o$=12, $z_i$=0, β=0°, $\bar{\omega}_{min}$=0, $\bar{\omega}_{max}$=π/2, et n(θ)=1,5556+0,1 cos θ. All dimensional variables here are in millimeters, and all angular variables here are in radians. Since $\bar{\omega}_{max}$=π/2, the projection of the upper contour onto the x-y (or XY) plane corresponds to the circle of radius $r_i$.

If a transmitter is placed somewhere in the circle of radius $r_i$, some of the incident light reaches the ruled optical surface and can be reflected, refracted, or totally reflected by Total Internal Reflection (or TIR). Depending on the angular position of the ring with respect to the transmitter, the distribution of the incident light can vary harmoniously in the opposite way to the case of FIG. 11.

Comparing the last column vector to the relationship given above (when the norm R(α) of the vector radius varies harmoniously as a function of angular position θ), i.e.:

$$s=[\pm R(\theta,\alpha)\cos(\alpha+\beta(\theta))\cos\theta,\pm R(\theta,\alpha)\cos(\alpha+\beta(\theta))\sin\theta,R(\theta,\alpha)\sin(\alpha+\beta(\theta))],$$

it can be seen that the inclination functions of the latter relation have been suppressed, since in this case the inclination angle β of the generatrix has been defined with respect to a local coordinate origin. But a global inclination $\alpha_{(m)}$ of the generatrix $R(\theta,\alpha_{(m)})$ can be included with a new inclination angle $\hat{\beta}(\theta)$.

It should be noted that it is possible, for example, to use a refractive index n(θ, $\hat{\omega}$) with harmonic variation and represented by the relation: n(θ, $\hat{\omega}$)=$n_0(\hat{\omega})+\Delta n(\bar{\omega})\sin(k\theta)$.

It should also be noted that an optical element 11 may include at least two ruled optical surfaces. For example, the inner ruled optical surface of FIG. 11 may be combined with the outer ruled optical surface of FIG. 12 in a single optical element 11. The result is an optical element 11 of the type shown in FIG. 13 (annular lens with two Total Internal Reflection (TIR) interfaces). It is important to note that the generator can also be a totally closed piecewise function. If a transmitter is placed at any point on the circle of radius $r_i$, some of the incident light reaches the inner ruled optical surface and some of the incident light reaches the outer ruled optical surface. Depending on the angular position of the ring relative to the transmitter, the light incident on the surfaces with TIR can be either refracted or reflected with TIR. The light reflected with TIR on the inner surface is refracted by the outer surface. The light reflected with TIR on the outer surface is refracted by the inner surface.

When creating an optical element 11 for transmission, with two ruled optical surfaces, several different strategies can be used.

Thus, a ring-shaped optical element 11 can be created with an inner surface TIR, and a ruled outer surface defined with:
- a circular arc generatrix with a center at the transmission point, so as not to deviate the radiation pattern so that it does not reach the inner surface, or not to deviate the radiation pattern reflected from the inner surface with TIR, or
- a free-shape geometry arc generatrix to refract or reflect the radiation pattern away from the inner surface, or to refract or reflect the radiation pattern reflected from the inner surface with TIR, or
- an arc generatrix with "optical barrier" geometry with TIR, in order to refract or reflect with TIR the radiation pattern so that it does not reach the inner surface, or to re-reflect with TIR the radiation pattern reflected by the inner surface with TIR. If the refraction/TIR optical function of the outer surface is 180° out of phase with the TIR/refraction optical function of the inner surface, another optical sub-element is created with the TIR/TIR/refraction function.

A ring-shaped optical element 11 can also be created with an outer surface TIR, and a ruled inner surface defined with:
- a circular arc generatrix with a center at the transmission point, so as not to deviate the radiation pattern so that it does not reach the outer surface, or to refract the radiation pattern reflected from the outer surface with TIR, or
- a free-shape geometry arc generatrix to refract or reflect the radiation pattern away from the outer surface, or to refract or reflect the radiation pattern reflected from the outer surface with TIR, or
- an arc generatrix with "optical barrier" geometry with TIR, in order to refract or reflect with TIR the radiation pattern so that it does not touch the external surface, or to re-reflect with TIR the radiation pattern reflected by the external surface with TIR. If the refraction/TIR optical function of the inner surface is 180° out of phase with the TIR/refraction optical function of the outer surface, another optical sub-element is created with the TIR/TIR/refraction function. Thus, and as shown non-limitingly in FIG. 14, a ruled annular mirror can be created with a straight-line segment as its generatrix. This illustrated mirror has two reflective faces: one outer and one inner. Furthermore, this mirror is here placed on a printed circuit board on which a Light Emitting Diode (or LED) and a Photo Diode (or PD) are installed. The outer part of the mirror is designed to change the direction of the radiant flux emitted by the LED, as a function of the angle ζ of mirror positioning, and at the same time, synchronously, the inner part of the mirror is designed to increase the radiant flux received by the PD photodiode, according to the same angle ζ of mirror positioning. If a transmitter is placed at any point on the circle of radius $r_i$, part of the incident light is reflected by the mirror.

In the initial position, when the angle of polar positioning is zero, the entire transmission pattern should be emitted without incidence on the outer (or external) part of the mirror. For this purpose, a line segment can be placed as a generatrix in the second quadrant representing the mirror, with slope m=tan(π/2+$\Theta_{0.9w}$/2)=)tan(145°. But when the mirror is rotated a quarter turn, and positioned with a polar positioning angle ζ equal to 180°=π radians, the mirror rotates about a point of coordinates ($r_0$, $z_0$) so that all radiation arrives on the mirror to be reflected with peak power at the horizon. This is possible when the slope of the mirror is m=tan($\Theta_{0.9w}$/2)=)tan(55°). This functionality is particularly useful for establishing efficient communication between nodes in an optical network that are on the same plane (e.g., a roof).

Note that the length of the straight-line segment can also be calculated to control how the power distribution varies when the radiation pattern is divided. In the base position ($\zeta$=0) the segment length does not influence the optical power distribution. But when the ring is in the opposite position ($\zeta$=180°), the minimum segment length can be calculated with $I_{180°}=|r_0|csc(\Theta_{0.9w}/2)*csc(\Theta_{0.9w})$, e.g., if $r_0$=−7 mm, then $z_0=|r_0|ctg(\Theta_{0.9w}/2)$=4.9 mm and $I_{180°}$=25 mm. In this way, the ruled annular mirror can be designed with a straight generatrix of constant length I=25 mm, or with a generatrix of harmonic variable length with $I_{min} \leq I \leq I_{180}°$(mm).

It should also be noted that an optical device 1-$n$ may comprise a mount supporting its optical element 11, as well as at least one electric motor for positioning its optical element 11 in space. The control of this positioning can be done manually or automatically.

It clearly appears that an optical device 1 such as the one described above allows the design of communication equipment 2 (such as optical signal repeaters, optical signal multiplexers, optical signal expanders or optical signal combiners, or combinations of repeater(s) and/or multiplexer(s) and/or expander(s) and/or combiner(s)) with multiple orientations, for example for use in spaces with multiple obstacles. Such communication equipment 2 can, in particular and not restrictively, be used in a communication satellite.

It should also be noted that the invention is not limited to the embodiments described above. Indeed, it will appear to those skilled in the art that various modifications can be made to the above-described embodiments, in the light of the teaching just disclosed to them. In the detailed presentation of the invention made above, the terms used should not be interpreted as limiting the invention to the embodiments set forth in the present description, but should be interpreted to include all equivalents the anticipation of which is within the reach of those skilled in the art by applying their general knowledge to the implementation of the teaching just disclosed to them.

The invention claimed is:

1. An optical device for a piece of communication equipment of an optical wireless communication network, said optical device comprising a monolithic optical element and comprising at least one ruled optical surface adapted to orient in space a radiation pattern for transmission and/or a radiation pattern for reception of light waves, wherein said at least one ruled surface is generated by translation and/or rotation of a curved generatrix, and wherein said curved generatrix of said at least one ruled optical surface of said optical element has non-zero harmonically varying orientation as a function of the translational and/or rotational position of said curved generatrix in said at least one ruled optical surface.

2. The device according to claim 1, wherein said ruled optical surface of the optical element has a continuously varying orientation, infinitely differentiable and expressible in Taylor series.

3. The device according to claim 2, wherein said curved generatrix is contained in a meridional plane, and is represented by a Cartesian position vector in said meridional plane represented using polar coordinates by $p_1=[\pm R(\alpha)\cos(\alpha+\beta), R(\alpha)\sin(\alpha+\beta)]$, where $\alpha$ is an angle of elevation, $R(\alpha)$ is the norm of a vector radius and $\beta$ is an angle of inclination varying harmonically as a function of angular position.

4. The device according to claim 3, wherein said norm $R(\alpha)$ of the vector radius varies harmonically as a function of angular position.

5. The device according to claim 1, wherein said ruled optical surface of the optical element is an internal face providing total internal reflection, and wherein said optical element has a refractive index that varies harmonically as a function of angular position.

6. The device according to claim 1, wherein said ruled optical surface of the optical element is open or closed.

7. A piece of communication equipment for an optical wireless communication network, said piece of communication equipment comprising at least a first receiver adapted to receive light waves coming from a first piece of equipment of said optical wireless communication network, and/or at least a first transmitter adapted to transmit light waves to said first piece of equipment or to a second piece of equipment of said optical wireless communication network, and at least a first optical device according to claim 1, placed upstream of said first receiver and/or downstream of said first transmitter.

8. The piece of communication equipment according to claim 7, comprising said first receiver and said first transmitter, and wherein said first optical device is placed upstream of said first receiver and downstream of said first transmitter so as to spatially orient a radiation pattern for reception of light waves and a radiation pattern for transmission of light waves.

9. The piece of communication equipment according to claim 8, wherein said first transmitter is adapted to transmit to said first piece of equipment other light waves coming from said second piece of equipment, and wherein the piece of communication equipment comprises a second transmitter coupled to said first receiver and adapted to transmit to said second piece of equipment said light waves coming from said first receiver, a second receiver adapted to receive said other light waves from said second piece of equipment and coupled to said first transmitter, and a second optical device placed upstream of said second receiver and downstream of said second transmitter in order to orient in space a radiation pattern for reception of said other light waves and a radiation pattern for transmission of said light waves.

10. The piece of communication equipment according to claim 8 wherein the piece of communication equipment constitutes an optical signal repeater and/or an optical signal multiplexer and/or an optical signal expander and/or an optical signal combiner.

11. The piece of communication equipment according to claim 7, comprising said first receiver and said first transmitter, wherein said first optical device is placed upstream of said first receiver in order to spatially orient a radiation pattern for reception of said light waves, and wherein the piece of communication equipment comprises a second optical device placed downstream of said first transmitter in order to spatially orient a radiation pattern for transmission of said light waves.

12. The piece of communication equipment according to claim 11, wherein said first transmitter is adapted to transmit to said first piece of equipment other light waves coming from said second piece of equipment, and wherein the piece of communication equipment comprises a second transmitter coupled to said first receiver and adapted to transmit to said second piece of equipment said light waves coming from said first receiver, a second receiver adapted to receive said other light waves from said second piece of equipment and coupled to said first transmitter, a third optical device placed upstream of said second receiver in order to spatially orient a radiation pattern for reception of said other light waves, and a fourth optical device placed downstream of said second transmitter in order to spatially orient a radiation pattern for transmission of said light waves.

13. The piece of communication equipment according to claim 7, wherein said at least one ruled surface of said first optical device is generated by rotation of the curved generatrix and wherein said curved generatrix has the non-zero harmonically varying orientation as a function of the rotational position of said curved generatrix, the rotational position being an angular rotational position.

14. The device according to claim 1, wherein said at least one ruled surface is generated by rotation of the curved generatrix and wherein said curved generatrix has the non-zero harmonically varying orientation as a function of the rotational position of said curved generatrix, the rotational position being an angular rotational position.

15. An optical device for a piece of communication equipment of an optical wireless communication network, said optical device comprising a monolithic optical element and comprising at least one ruled optical surface adapted to orient in space a radiation pattern for transmission and/or a radiation pattern for reception of light waves, wherein said at least one ruled surface is generated by translation and/or rotation of a curved generatrix, and wherein said curved generatrix of said at least one ruled optical surface of said optical element has an orientation which varies harmonically with a non-zero variation as a function of the translational and/or rotational position of said curved generatrix generating said at least one ruled optical surface.

16. The device according to claim 15, wherein said at least one ruled surface is generated by rotation of the curved generatrix and wherein the orientation varies harmonically with the non-zero variation as a function of the rotational position of said curved generatrix, the rotational position being an angular rotational position.

* * * * *